United States Patent
Ogishima et al.

(10) Patent No.: US 12,266,226 B2
(45) Date of Patent: Apr. 1, 2025

(54) VEHICLE ONBOARD APPARATUS, IMAGE RECOGNITION SYSTEM, SUPPORT APPARATUS FOR VEHICLE ONBOARD APPARATUS, IMAGE RECOGNITION METHOD, AND MODEL DATA TRANSMISSION METHOD

(71) Applicant: DENSO TEN Limited, Kobe (JP)

(72) Inventors: Aoi Ogishima, Tokyo (JP); Yasutaka Okada, Kobe (JP); Ryusuke Seki, Kobe (JP); Yuki Katayama, Kobe (JP); Rei Hiromi, Kobe (JP)

(73) Assignee: DENSO TEN Limited, Kobe (JP)

( * ) Notice: Subject to any disclaimer, the term of this patent is extended or adjusted under 35 U.S.C. 154(b) by 382 days.

(21) Appl. No.: 17/690,502

(22) Filed: Mar. 9, 2022

(65) Prior Publication Data

US 2023/0086088 A1   Mar. 23, 2023

(30) Foreign Application Priority Data

Sep. 17, 2021   (JP) ................... 2021-151729

(51) Int. Cl.
*G07C 5/00* (2006.01)
*G08G 1/09* (2006.01)

(52) U.S. Cl.
CPC ............. *G07C 5/008* (2013.01); *G08G 1/091* (2013.01)

(58) Field of Classification Search
CPC ........ G07C 5/008; G08G 1/091; G08G 1/012; G08G 1/0133; G08G 1/0141; G08G 1/096775; G08G 1/09623; G06N 3/098; G06F 18/285; G06V 20/56
USPC .......................................................... 701/28
See application file for complete search history.

(56) References Cited

U.S. PATENT DOCUMENTS

2022/0058778 A1 *   2/2022   Lin .......................... G06T 7/70

FOREIGN PATENT DOCUMENTS

| EP | 1826648 B1 | * | 9/2011 |
| JP | 2020-093760 | * | 6/2020 |
| JP | 2020-093760 A | | 6/2020 |
| KR | 2021-0074217 A | * | 6/2021 |

* cited by examiner

*Primary Examiner* — Muhammad Shafi
(74) *Attorney, Agent, or Firm* — Oliff PLC

(57) ABSTRACT

A vehicle onboard apparatus mounted in a vehicle includes an in-vehicle processing unit that performs image recognition on an input image from a camera mounted in the vehicle. The in-vehicle processing unit performs the image recognition using an image recognition model corresponding to position information of the vehicle and additional reference information different from the position information.

4 Claims, 12 Drawing Sheets

TARGET MODEL: 113_2 ← 113_1

VEHICLE ONBOARD APPARATUS, IMAGE RECOGNITION SYSTEM, SUPPORT APPARATUS FOR VEHICLE ONBOARD APPARATUS, IMAGE RECOGNITION METHOD, AND MODEL DATA TRANSMISSION METHOD

CROSS-REFERENCE TO RELATED APPLICATIONS

This nonprovisional application claims priority under 35 U.S.C. § 119(a) on Patent Application No. 2021-151729 filed in Japan on Sep. 17, 2021, the entire contents of which are hereby incorporated by reference.

BACKGROUND OF THE INVENTION

Field of the Invention

The present invention relates to a vehicle onboard apparatus, an image recognition system, a support apparatus for a vehicle onboard apparatus, an image recognition method, and a model data transmission method.

Description of Related Art

Development or research has been conducted for a vehicle onboard apparatus capable of performing image recognition (such as object detection) on an image photographed with a vehicle mounted camera.

Note that there is proposed a technique for supporting control of a vehicle by using a learned model by machine learning. In this technique, the learned model is set for each predetermined area, and the learned models are switched in accordance with vehicle position (see, for example, the abstract and paragraphs 0049 to 0052 in the following Patent Document 1).

Patent Document 1: JP-A-2020-93760

A method of setting an image recognition model in accordance with vehicle position information (i.e., a method of performing image recognition using an image recognition model corresponding to vehicle position information) is studied. With this method, it is possible to perform image recognition corresponding to characteristics of regions, and it is expected to improve recognition accuracy. However, image recognition is affected by various factors, and hence there is room for improvement.

SUMMARY OF THE INVENTION

An object of the present invention is to provide a vehicle onboard apparatus, an image recognition system, a support apparatus for a vehicle onboard apparatus, an image recognition method, and a model data transmission method, which contribute to realizing an appropriate image recognition that supports various situations.

A vehicle onboard apparatus according to the present invention, which is a vehicle onboard apparatus mounted in a vehicle, includes an in-vehicle processing unit that performs image recognition on an input image from a camera mounted in the vehicle, and the in-vehicle processing unit performs the image recognition using an image recognition model corresponding to position information of the vehicle and additional reference information different from the position information.

A support apparatus for a vehicle onboard apparatus according to the present invention, which is a support apparatus configured to be capable of communicating with a vehicle onboard apparatus that performs image recognition on an input image from a camera mounted in a vehicle, includes a data holding unit that holds a plurality of model data for the vehicle onboard apparatus to set an image recognition model for performing the image recognition, and a support processing unit that selects one of the plurality of model data on the basis of position information of the vehicle and additional reference information different from the position information, and sends the selected model data to the vehicle onboard apparatus.

According to the present invention, it is possible to provide a vehicle onboard apparatus, an image recognition system, a support apparatus for a vehicle onboard apparatus, an image recognition method, and a model data transmission method, which contribute to realizing an appropriate image recognition that supports various situations.

DETAILED DESCRIPTION OF THE PREFERRED EMBODIMENTS

Figure 1:
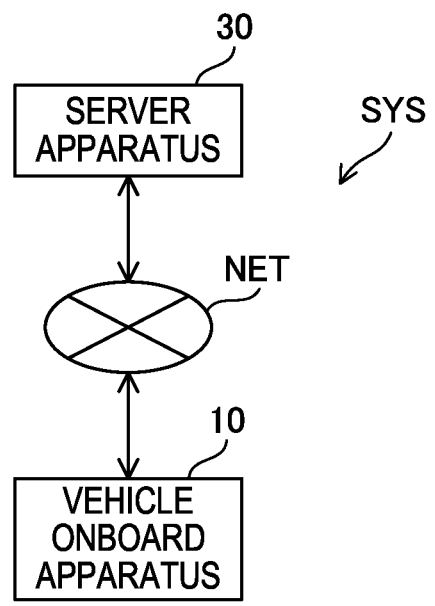
FIG. 1 is an overall configuration diagram of a system (image recognition system) according to an embodiment of the present invention.

Hereinafter, examples of an embodiment of the present invention are described in detail with reference to the drawings. In the drawings that are referred to, the same part is denoted by the same reference numeral or symbol, and overlapping description thereof is omitted as a rule. Note that in this specification, for simple description, a name of information, a signal, a physical quantity, a member, or the like corresponding to a reference numeral or symbol may be omitted or abbreviated by specifying the same using the reference numeral or symbol.

Figure 2:
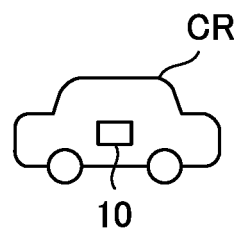
FIG. 2 is a diagram illustrating a state where a vehicle onboard apparatus is mounted in a vehicle, according to the embodiment of the present invention.

FIG. 1 is an overall configuration diagram of a system SYS according to an embodiment of the present invention. The system SYS is configured to include a vehicle onboard apparatus 10 and a server apparatus 30. In the system SYS, the vehicle onboard apparatus 10 is installed and mounted in a vehicle CR as illustrated in FIG. 2. The vehicle CR can be any type of vehicle, but here it is supposed to be an automobile or the like that can drive on a road. The vehicle onboard apparatus 10 and the server apparatus 30 are connected to each other in a wireless manner via a predetermined communication network NET so that they can communicate bidirectionally. The communication network NET includes a mobile communication network and the Internet.

As described in detail later, the vehicle onboard apparatus 10 can perform image recognition on a camera image, and the server apparatus 30 provides the vehicle onboard apparatus 10 with data necessary to realize the image recognition. Therefore, it can be said that the server apparatus 30 has a function as a support apparatus for the vehicle onboard apparatus 10. In addition, it can also be said that the vehicle onboard apparatus 10 and the server apparatus 30 comprise an image recognition system. In this embodiment, it is supposed that the vehicle onboard apparatus 10 is a vehicle onboard apparatus having a drive recorder function. The vehicle onboard apparatus 10 may be a drive recorder itself. An easily portable information terminal apparatus such as a smartphone may be used as the vehicle onboard apparatus 10.

Figure 3:
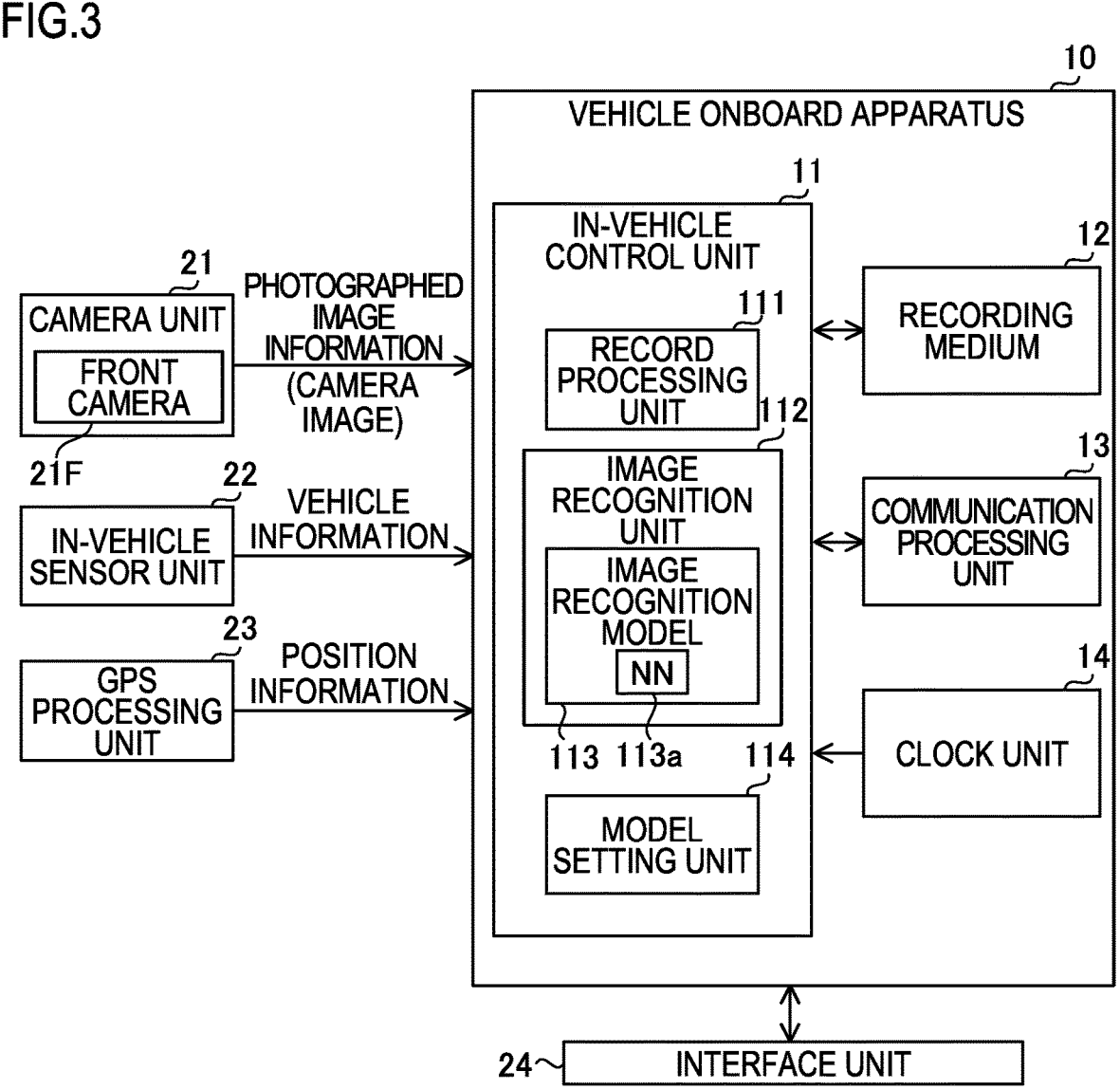
FIG. 3 is a diagram illustrating an internal configuration of the vehicle onboard apparatus and peripheral devices of the vehicle onboard apparatus, according to the embodiment of the present invention.

FIG. 3 illustrates an internal configuration of the vehicle onboard apparatus 10 and peripheral devices of the vehicle onboard apparatus 10. A plurality of peripheral devices are connected to the vehicle onboard apparatus 10. The plurality of peripheral devices are also mounted in the vehicle CR similarly to the vehicle onboard apparatus 10. The plurality of peripheral devices include a camera unit 21, an in-vehicle sensor unit 22, a GPS processing unit 23, and an interface unit 24. Information is communicated between each peripheral device and the vehicle onboard apparatus 10 via a controller area network (CAN) formed in the vehicle CR, for example. However, any one or more units out of the camera unit 21, the GPS processing unit 23, and the interface unit 24 may be included as structural elements in the vehicle onboard apparatus 10.

The camera unit 21 consists of one or more cameras mounted in the vehicle CR. Each camera constituting the camera unit 21 photographs scenes in its shooting area (field of view) at a predetermined frame rate in series and sends image information of the photographed image indicating a photographing result in series to the vehicle onboard apparatus 10. The image information of the photographed image using the camera unit 21 is particularly referred to as photographed image information. In addition, the photographed image using the camera unit 21 can be referred to as a camera image. The camera unit 21 includes at least a front camera 21F having a shooting area that is outside and front of the vehicle CR. In the following description, it is considered that the photographed image information indicates image information (image data) of the photographed image using the front camera 21F, and that the camera image indicates the photographed image obtained using the front camera 21E In the following description, "photographing" means photographing using the camera unit 21 (front camera 21F) unless otherwise described.

The in-vehicle sensor unit 22 consists of a plurality of in-vehicle sensors mounted in the vehicle CR, and each in-vehicle sensor is used for detecting and obtaining vehicle information. The vehicle information is obtained sequentially in a predetermined cycle, and the obtained vehicle information is sent to the vehicle onboard apparatus 10 in series. The vehicle information includes vehicle speed information that indicates speed of the vehicle CR, accelerator information that indicates stepping amount of an accelerator pedal of the vehicle CR, brake information that indicates stepping amount of a brake pedal of the vehicle CR, steering angle information that indicates steering angle of a steering wheel of the vehicle CR, and the like. An acceleration sensor is also included in the plurality of in-vehicle sensors described above, and acceleration information output from the acceleration sensor is also included in the vehicle information described above. The acceleration sensor detects acceleration of the vehicle CR in two or three axis directions that are orthogonal to each other, and outputs acceleration information indicating the detection result.

The GPS processing unit 23 receives signals from a plurality of GPS satellites constituting a global positioning system (GPS) so as to detect position (current position) of the vehicle CR, and delivers position information indicating the detected position. In the position information, position (current position) of the vehicle CR is expressed using longitude and latitude on the Earth. The GPS processing unit 23 generates the position information sequentially in a predetermined cycle, and sends the generated position information to the vehicle onboard apparatus 10 in series.

The interface unit 24 is a man-machine interface between the vehicle onboard apparatus 10 and occupants (mainly a driver) of the vehicle CR.

The vehicle onboard apparatus 10 includes an in-vehicle control unit 11, a recording medium 12, a communication processing unit 13, and a clock unit 14.

The in-vehicle control unit 11 includes hardware resources, which are an arithmetic and processing unit including a central processing unit (CPU), a graphics processing unit (GPU), and the like, and a memory including a read only memory (ROM), a random access memory (RAM), and the like. In the in-vehicle control unit 11, function blocks denoted by numerals 111 to 114 may be realized by the arithmetic and processing unit executing a program stored in the memory. These function blocks will be described later. The in-vehicle control unit 11 itself or the arithmetic and processing unit provided in the in-vehicle control unit 11 is an example of the in-vehicle processing unit according to the present invention.

The recording medium 12 is constituted of a magnetic disk, a semiconductor memory, or the like, or a combination thereof. The recording medium 12 is a nonvolatile recording medium, which stores any data under control of the in-vehicle control unit 11. It may be possible to provide the vehicle onboard apparatus 10 with a recording medium mounting part (not shown), so that the recording medium 12 can be attached to and detached from the recording medium mounting part. Note that in this specification, the word "data" has the same meaning as the word "information".

The communication processing unit 13 performs bidirectional communication with apparatuses on the other side via the communication network NET. The apparatuses on the other side for the vehicle onboard apparatus 10 include at least the server apparatus 30. The communication between the vehicle onboard apparatus 10 and the apparatus on the other side is performed using the communication processing unit 13, but the communication processing unit 13 may not be mentioned in the following description.

The clock unit 14 generates date and time information that indicates current date and time. It may be possible to use a received signal of the GPS processing unit 23 for generating or correcting the date and time information.

Any information (such as the photographed image information, the vehicle information, the position information, or the date and time information) obtained or generated by the vehicle onboard apparatus 10 may be properly sent to the server apparatus 30.

Figure 4:
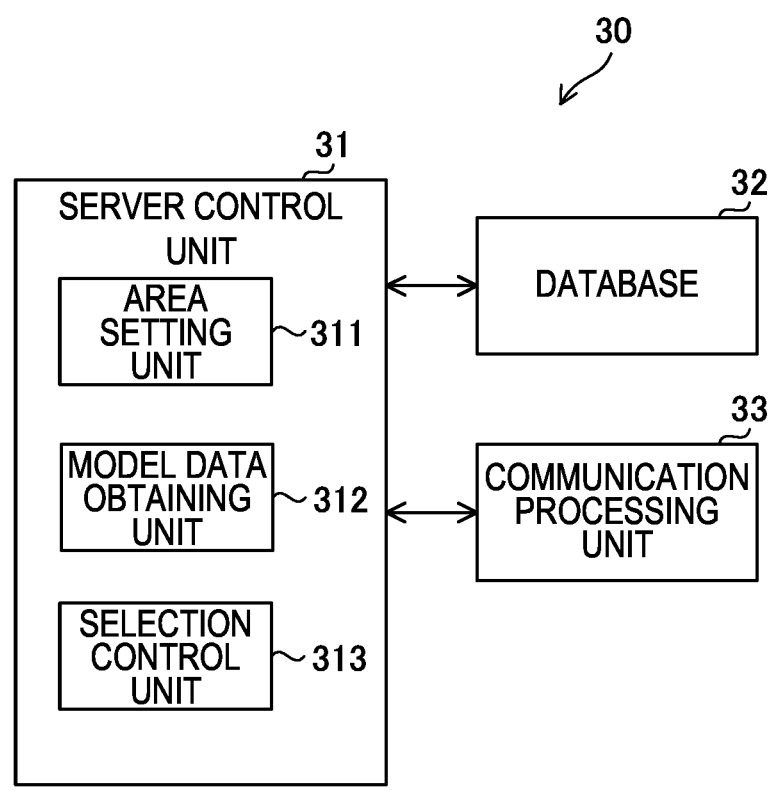
FIG. 4 is a diagram illustrating an internal configuration of a server apparatus according to the embodiment of the present invention.

FIG. 4 illustrates a schematic structural block diagram of the server apparatus 30. The server apparatus 30 includes a server control unit 31, a database 32, and a communication processing unit 33. The server apparatus 30 may be constituted of a single computer apparatus, or may be constituted of a plurality of computer apparatuses. It may be possible to use a so-called cloud computing for constituting the server apparatus 30. The database 32 may be incorporated in the server apparatus 30, or may be disposed outside of the server apparatus 30 and connected to the server apparatus 30 in a wired or wireless manner.

The server control unit 31 includes hardware resources, which are an arithmetic and processing unit including a central processing unit (CPU), a graphics processing unit (GPU), and the like, and a memory including a read only memory (ROM), a random access memory (RAM), and the like. In the server control unit 31, function blocks denoted by numerals 311 to 313 may be realized by the arithmetic and processing unit executing a program stored in the memory. These function blocks will be described later. The server control unit 31 itself or the arithmetic and processing unit provided in the server control unit 31 is an example of the support processing unit according to the present invention.

The database 32 is a nonvolatile recording medium constituted of a magnetic disk, a semiconductor memory, or the like, or a combination thereof. The database 32 stores any data under control of the server control unit 31.

The communication processing unit 33 communicates bidirectionally with apparatuses on the other side via the communication network NET. The apparatuses on the other side for the server apparatus 30 include at least the vehicle onboard apparatus 10. The communication between the server apparatus 30 and the apparatus on the other side is performed using the communication processing unit 33, but the communication processing unit 33 may not be mentioned in the following description.

With reference to FIG. 3, function blocks of the in-vehicle control unit 11 are described below. The in-vehicle control unit 11 includes, as a plurality of function blocks, a record processing unit 111, an image recognition unit 112, an image recognition model 113, and a model setting unit 114.

The record processing unit 111 performs processing for recording the photographed image information in the recording medium 12. For instance, the record processing unit 111 can perform the following basic recording process as a function of the drive recorder. In the basic recording process, the photographed image information obtained in series from the camera unit 21 is recorded in the recording medium 12 in series along time series. In this case, related information is also recorded in the recording medium 12 in a state associated with the photographed image information. In other words, in the basic recording process, the photographed image information and the related information obtained at a certain time point are associated with each other and are recorded in the recording medium 12. The related information may include the vehicle information, the position information, and the date and time information, which are described above, and may further include other information. The recording medium 12 has a recording capacity for recording a predetermined time period of the photographed image information and the related information. In the basic recording process, if there is little free space in the recording medium 12, the photographed image information and the related information obtained at the earliest time point are overwritten by the new photographed image information and related information. Note that when an event has occurred, a predetermined time period of the photographed image information and the related information may be recorded in an overwrite inhibited state in the recording medium 12. The event is, for example, a situation where acceleration of the vehicle CR exceeds a predetermined value.

The image recognition unit 112 receives an input image that is the camera image from the camera unit 21, and performs predetermined image recognition on the input image. In other words, the image recognition unit 112 receives the camera image from the camera unit 21 and performs image recognition on the received camera image. The image recognition unit 112 has the image recognition model 113 and uses the image recognition model 113 for performing the image recognition.

The image recognition model 113 is configured to include a neural network (hereinafter may be referred to as NN) 113a, and parameters for image recognition are set for the NN 113a, so that the image recognition model 113 is created. The parameters of the neural network include weight and bias. The image recognition model 113 is created by machine learning. The machine learning itself is performed in the server apparatus 30. The parameters derived from the machine learning are supplied to the vehicle onboard apparatus 10, and hence the vehicle onboard apparatus 10 creates the image recognition model 113. Note that the machine learning may be performed by another apparatus (not shown), which is different from the server apparatus 30 or the vehicle onboard apparatus 10. The machine learning may be one classified into deep learning, and an arbitrary neural network in this embodiment may be a deep neural network.

The image recognition model 113 performs image recognition on the camera image on the basis of the photographed image information of the camera image (input image). This image recognition is a process of detecting type and position of an object to be detected in the camera image, and it may be a process usually called object detection. Objects to be detected include a vehicle, a human body, a traffic signal, a traffic sign, and the like. The image recognition may be semantic segmentation, instant segmentation, or the like.

Using the result of the image recognition, the in-vehicle control unit 11 can extract only a partial image from the camera image so as to record the partial image in the recording medium 12 or send the same to the server apparatus 30. Alternatively, the in-vehicle control unit 11 can process the camera image on the basis of the result of the image recognition so as to record the processed camera image in the recording medium 12 or send the same to the server apparatus 30. The above-mentioned process is, for example, a process of masking a human face image or a vehicle license plate image included in the camera image. In addition, for example, the result of the image recognition may be used for automated driving control or drive assist control of the vehicle CR.

The data necessary for creating the image recognition model 113 is referred to as model data. The model data is data generated for the NN 113a to perform the image recognition. The model data includes parameters (weight and bias) to be set in the NN 113a, and if necessary it may further include data other than the parameters.

The model setting unit 114 uses the model data for setting the image recognition model 113. The setting of the image recognition model 113 may be read as creation of the image recognition model 113 (the opposite is also true). To set the image recognition model 113 by using the model data means to set parameters in the model data to the NN 113a, so that the image recognition unit 112 creates the image recognition model 113 enabling effective image recognition.

When parameters applied to the image recognition model 113 (i.e. parameters set to the NN 113a) are changed, characteristics (or contents) of the image recognition model 113 are also changed. As a result, characteristics of the image recognition performed by using the image recognition model 113 are also changed. For instance, optimal parameters in the image recognition model 113 (parameters that are most appropriate for identifying the object to be detected) may be different between a case where the vehicle CR is moving in a first area and a case where the vehicle CR is moving in a second area. Considering this, parameters applied to the image recognition model 113 are changed in accordance with position information of the vehicle CR in this embodiment.

Further, optimal parameters change also depending on information such as time slot, traffic state, weather, or the like (additional reference information). Considering this, the model setting unit 114 applies model data (parameters) corresponding to position information of the vehicle CR and additional reference information to the image recognition model 113. In this way, characteristics of the image recognition model 113 are changed in accordance with the position information and the additional reference information.

As a result, the vehicle onboard apparatus 10 can perform appropriate image recognition adjusted to various situations (preferably optimal image recognition). The vehicle onboard apparatus 10 obtains the input images (camera images) of various scenes. Methods for maintaining high detection performance (identification performance) in every scene include a method of creating a model that can support every scene and a method of switching models to be used for each scene (including switching of parameters of the model). In the former method, it is predicted that the model will have a large structure, and it may not be practical to maintain high detection performance in every scene. Therefore the latter method is studied, but it requires a model switching control technique. Using the model setting unit 114 described above, it is possible to perform appropriate image recognition adjusted to various scenes.

Figure 5A:
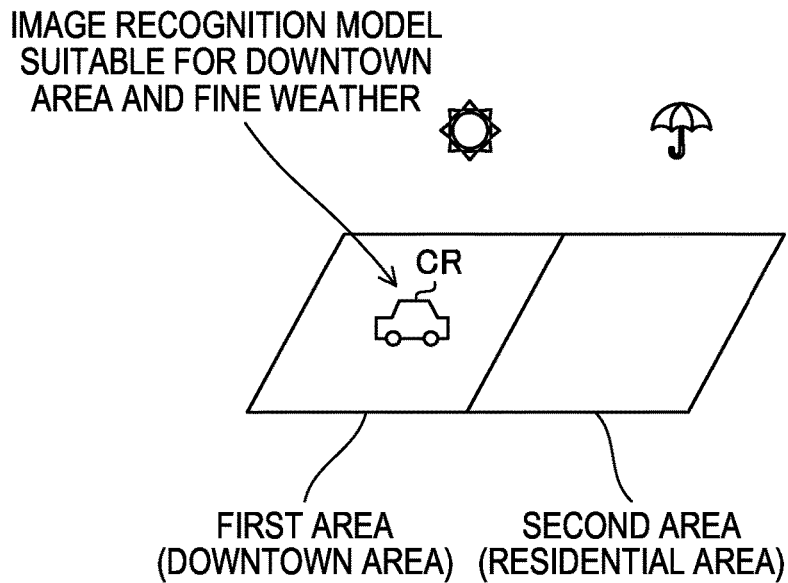
FIGS. 5A and 5B are diagrams illustrating a state where an image recognition model is set in accordance with an area where a vehicle is located and the like, according to the embodiment of the present invention.
Figure 5B:
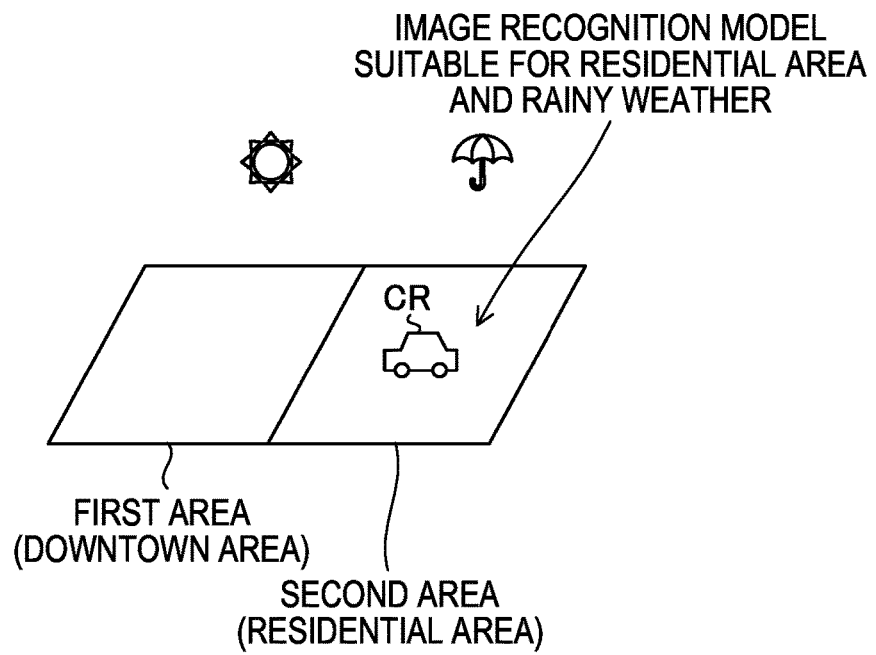

A simple example is illustrated in FIGS. 5A and 5B. It is supposed that the first area is a downtown area and that the second area is a residential area. As illustrated in FIG. 5A, when the vehicle CR is located in the first area, if the first area has fine weather, model data suitable for downtown and fine weather is applied to the image recognition model 113. In this way, the image recognition is performed using the image recognition model 113 suitable for downtown and fine weather. As illustrated in FIG. 5B, when the vehicle CR is located in the second area, if the second area has rainy weather, model data suitable for residential area and rainy weather is applied to the image recognition model 113. In this way, the image recognition is performed using the image recognition model 113 suitable for residential area and rainy weather.

Here it is supposed that model data corresponding to position information and additional reference information is supplied from the server apparatus 30 to the vehicle onboard apparatus 10. With reference to FIG. 4, function blocks of the server control unit 31 related to supply of the model data are described below. The server control unit 31 includes a plurality of function blocks, which are an area setting unit 311, a model data obtaining unit 312, and a selection control unit 313.

The area setting unit 311 divides a predetermined service provided area on a map into a plurality of areas, and thus the plurality of areas are set in the predetermined service provided area. Individual areas obtained by the division are referred to as element areas, for convenience of description. The plurality of element areas are denoted by symbols AR[1] to AR[n]. The combination area of the plurality of element areas AR[1] to AR[n] corresponds to the service provided area. The service provided area is an area on a map, in which services of the system SYS are provided, and includes the entire or a part of the land in the United States or Japan, for example. Character n is an integer of 2 or more and is usually sufficiently larger than 2. Any two element areas out of the plurality of element areas AR[1] to AR[n] do not have an overlapping area.

Figure 6:
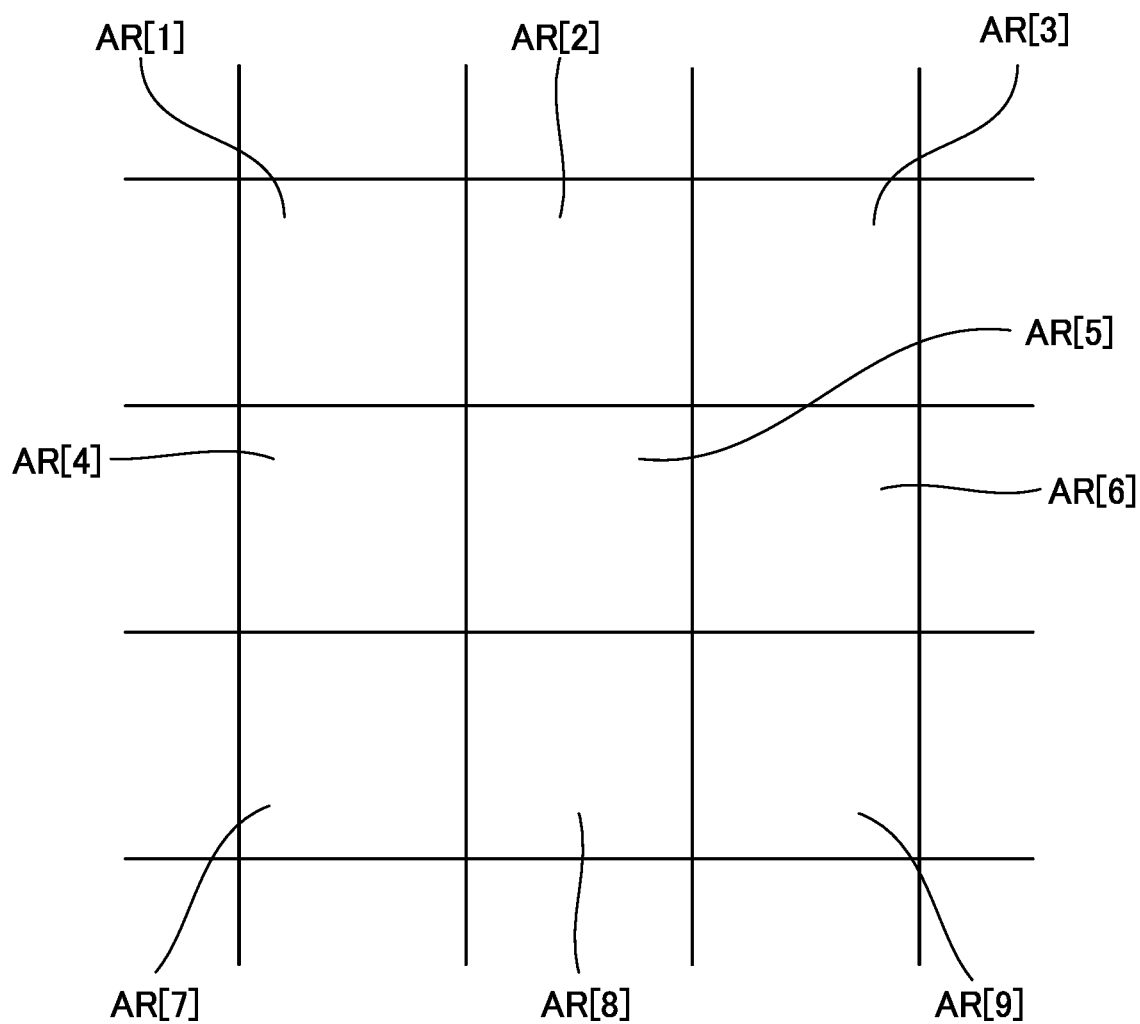
FIG. 6 is a diagram illustrating a state where a plurality of element areas are set in a service provided area, according to the embodiment of the present invention.

FIG. 6 illustrates element areas AR[1] to AR[9] as a part of the element areas AR[1] to AR[n]. In the example of FIG. 6, a predetermined size of area is divided into three in the north south direction and into three in the east west direction, and hence the element areas AR[1] to AR[9] are formed. In other words, the element areas AR[1] to AR[9] have the same size and shape in the example of FIG. 6.

Figure 7:
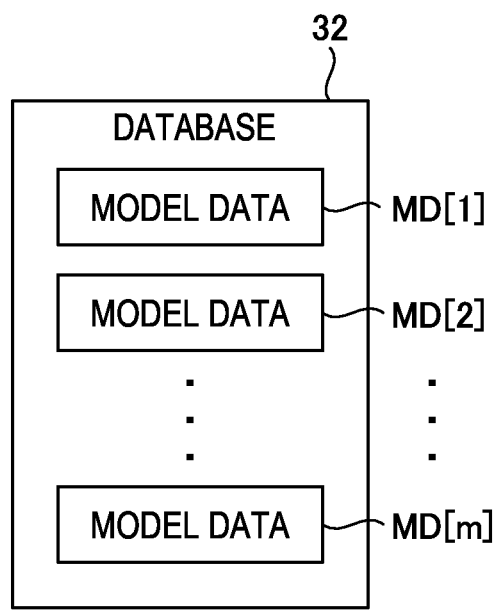
FIG. 7 is a diagram illustrating a state where a plurality of model data are held in a database according to the embodiment of the present invention.

On the other hand, the database 32 (see FIG. 4) holds a plurality of model data for the vehicle onboard apparatus 10 to create the image recognition model 113. As illustrated in FIG. 7, the plurality of model data held in the database 32 are referred to as model data MD[1] to MD[m]. Character m is an integer of 2 or more and is usually sufficiently larger than 2. The database 32 is an example of the data holding unit that holds the model data MD[1] to MD[m].

The model data obtaining unit 312 obtains the model data MD[1] to MD[m], so as to allow the database 32 to hold the obtained model data MD[1] to MD[m]. Each of the model data MD[1] to MD[m] is created by machine learning. The model data obtaining unit 312 itself performs machine learning so as to generate and obtain the model data MD[1] to MD[m]. However, it may be possible that another apparatus (not shown) different from the server apparatus 30 or the vehicle onboard apparatus 10 performs machine learning, and that the model data MD[1] to MD[m] generated by the another apparatus are supplied to the obtaining unit 312.

The selection control unit 313 selects one of the model data MD[1] to MD[m] on the basis of position information of the vehicle CR and additional reference information. The model data selected by the selection control unit 313 is referred to as target model data. The selection control unit 313 can send the target model data to the vehicle onboard apparatus 10. In this case, the vehicle onboard apparatus 10 receives the target model data, and the image recognition model 113 is set (created) using the target model data. More specifically, parameters in the target model data are set to the NN 113a, so as to set (create) the image recognition model 113 to which parameters in the target model data are applied.

In this way, the vehicle onboard apparatus 10 can perform appropriate image recognition adjusted to various situations (preferably optimal image recognition).

Figure 8:
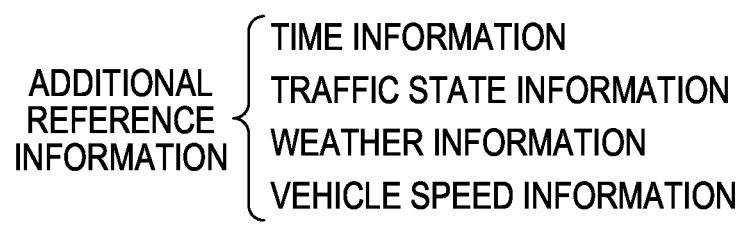
FIG. 8 is a structural diagram of additional reference information according to the embodiment of the present invention.

FIG. 8 illustrates an example of additional reference information. The additional reference information can include any one or more information among time information, traffic state information, weather information, and vehicle speed information.

The time information indicates current time. The server control unit 31 may generate and obtain the time information by itself using a timer, or may obtain the time information from any other apparatus.

For instance, there is a difference between parameters suitable for performing image recognition during daytime and parameters suitable for performing image recognition during night-time. Therefore, by arranging the additional reference information to include time information and by changing the parameters to be applied to the image recognition model 113 in accordance with the time information, the vehicle onboard apparatus 10 can perform image recognition suitable for time slot.

The traffic state information indicates the traffic state of each element area (respective traffic states of the element areas AR[1] to AR[n]). More specifically, the traffic state information indicates road congestion information (whether the road is congested or not) in each element area. A congestion information management server (not shown), which provides congestion information at each point in the service provided area, is connected to the communication network NET. The server control unit 31 can obtain the traffic state information on the basis of the congestion information provided from the congestion information management server.

For instance, there is a difference between parameters suitable for performing image recognition in a congested environment and parameters suitable for performing image recognition in a non-congested environment. Therefore, by arranging the additional reference information to include traffic state information and by changing the parameters to be applied to the image recognition model 113 in accordance with the traffic state information, the vehicle onboard apparatus 10 can perform image recognition suitable for traffic state.

The weather information indicates weather in each element area (weather in each of the element areas AR[1] to AR[n]). A weather information providing server (not shown), which provides weather information at each point in the service provided area, is connected to the communication network NET. The server control unit 31 can obtain the weather information on the basis of the information provided from the weather information providing server. The weather information may include, in addition to current weather at each element area, future weather forecast information at each element area.

For instance, there is a difference between parameters suitable for performing image recognition in fine weather environment and parameters suitable for performing image recognition in rainy weather environment. Therefore, by arranging the additional reference information to include weather information and by changing the parameters to be applied to the image recognition model 113 in accordance with the weather information, the vehicle onboard apparatus 10 can perform image recognition suitable for weather.

Note that meaning of arranging the additional reference information to include vehicle speed information will be described later. In the following description, unless otherwise described in this embodiment, it is supposed that the additional reference information includes time information, traffic state information, and weather information.

As described above, the model data obtaining unit 312 performs machine learning so that the model data MD[1] to MD[m] can be generated. In this case, a neural network (hereinafter referred to as a server NN) having the same structure as the NN 113a is disposed in the server control unit 31, and the machine learning for image recognition is performed on the server NN. The server NN after the machine learning is a learned model for performing the image recognition. By setting m types of conditions and by performing the machine learning in each condition, m types of model data, i.e. the model data MD[1] to MD[m] can be obtained.

Figure 9:
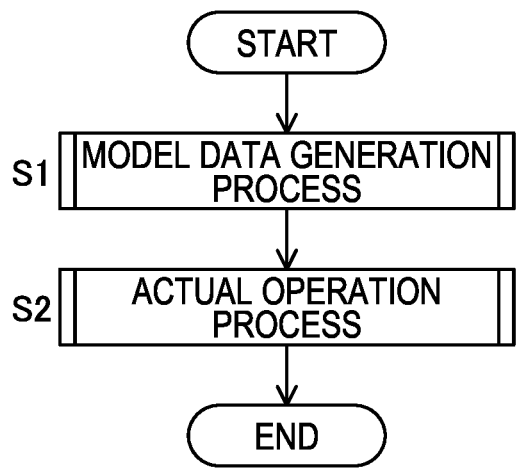
FIG. 9 is a general operation flowchart of the system illustrated in FIG. 1, according to the embodiment of the present invention.

As illustrated in FIG. 9, the system SYS first performs a model data generation process in Step 51, and afterwards performs an actual operation process at Step S2. In the model data generation process, the model data MD[1] to MD[m] are generated and stored in the server apparatus 30. In the actual operation process, the vehicle onboard apparatus 10 performs image recognition using any one or more of the model data MD[1] to MD[m]. The above-mentioned operations of the image recognition unit 112, the image recognition model 113, and the model setting unit 114 are operations in the actual operation process.

Figure 10:
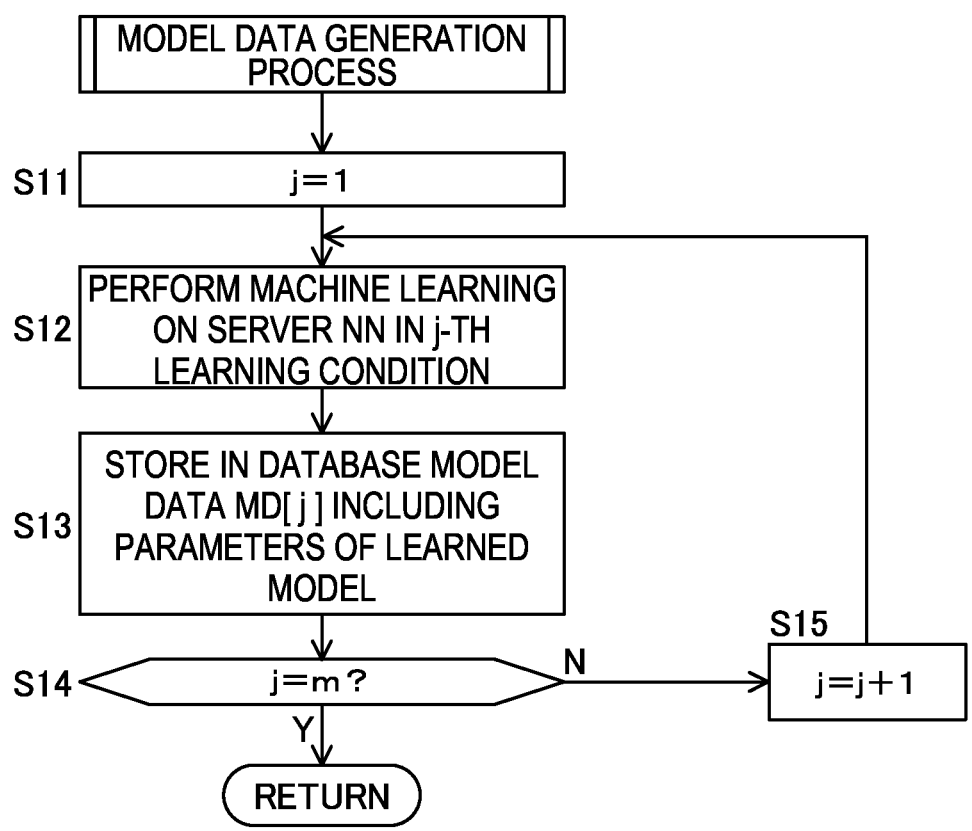
FIG. 10 is a flowchart of a model data generation process according to the embodiment of the present invention.

FIG. 10 is a flowchart of the model data generation process. With reference to FIG. 10, the model data generation process is described below. In the model data generation process, first in Step S11, 1 is substituted into variable j indicating the number of the model data. Note that at the time point of Step S11, none of the model data MD[1] to MD[m] is stored in the database 32. In Step S12 after Step S11, the model data obtaining unit 312 performs machine learning on the server NN in the j-th learning condition. When the machine learning in Step S12 is completed, the process flow proceeds to Step S13.

In Step S13, the model data obtaining unit 312 arranges the model data MDI[j] to include parameters (weight and bias) of the learned model obtained by machine learning in the j-th learning condition, and stores the model data MDI[j] in the database 32. In following Step S14, it is checked whether j=m is satisfied or not. If j=m is not satisfied (N in Step S14), the variable j is incremented by 1 in Step S15, and the process flow returns to Step S12, so that the processes of Step S12 and after are performed again. If j=m is satisfied (Y in Step S14), the processes of FIG. 10 are finished. At the time point of Step S14 when j=m is satisfied so that the processes of FIG. 10 are finished, the model data MD[1] to MD[m] are all stored in the database 32.

Figure 11:
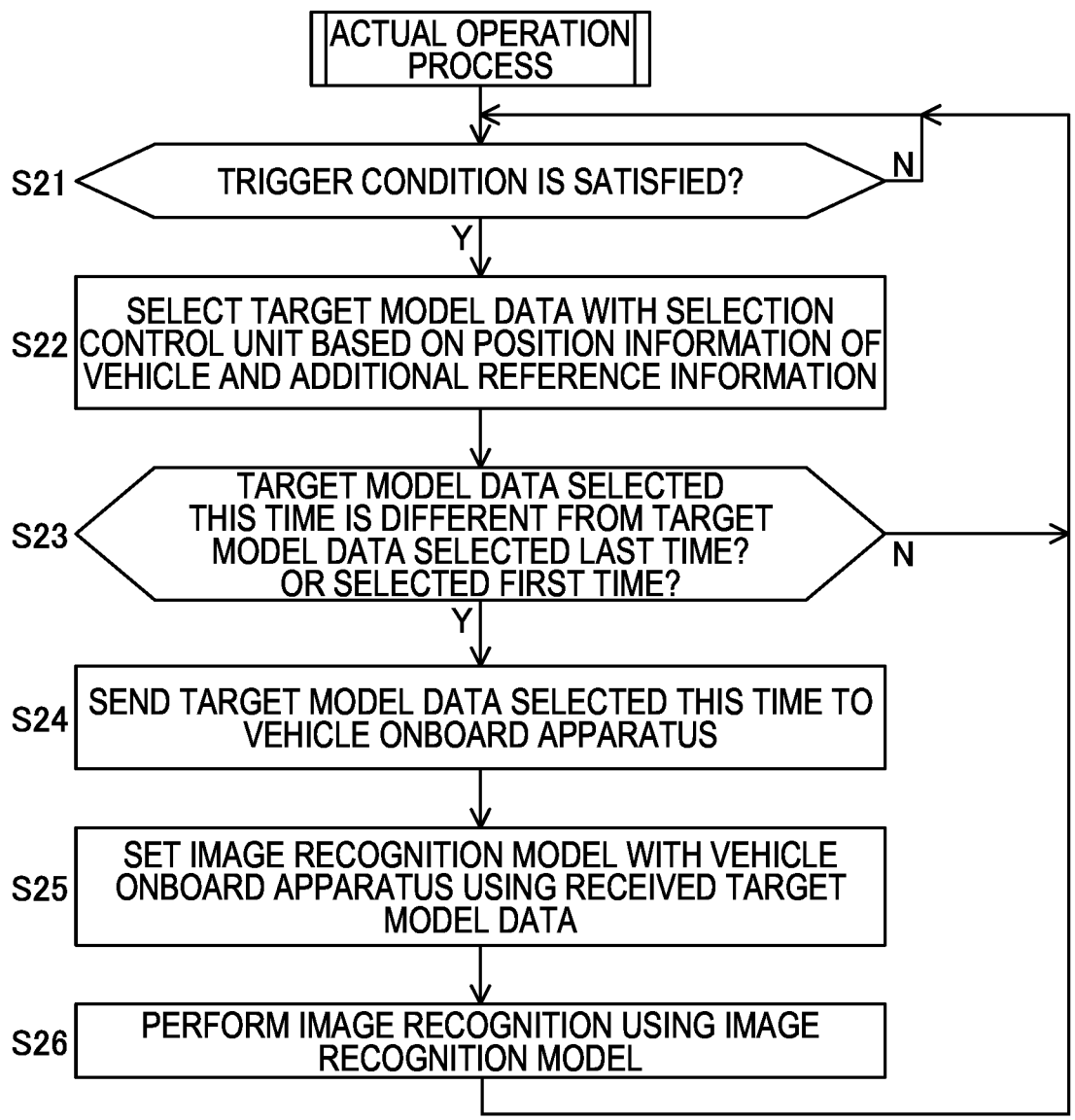
FIG. 11 is a flowchart of an actual operation process according to the embodiment of the present invention.

FIG. 11 is a flowchart of the actual operation process. With reference to FIG. 11, the actual operation process is described below. The actual operation process consists of the following processes of Steps S21 to S26. In Step S21, the server control unit 31 checks whether or not a predetermined trigger condition is satisfied. The trigger condition is satisfied every time when a predetermined time has elapsed (i.e. at every predetermined interval of time). Alternatively, the trigger condition is satisfied at a predetermined time point. There are a plurality of predetermined time points in a day. If the trigger condition is not satisfied (N in Step S21), the process of Step S21 is repeated. When the trigger condition is satisfied (Yin Step S21), the process flow proceeds to Step S22.

In Step S22, the selection control unit 313 (see FIG. 4) selects one of the model data MD[1] to MD[m] as the target model data, on the basis of the latest position information of the vehicle CR and the latest additional reference information. In other words, the selection control unit 313 performs the above-mentioned selection on the basis of which one of the element areas AR[1] to AR[n] the vehicle CR is currently located in and additional reference information. After Step S22, the process flow proceeds to Step S23.

As becoming clear from the description later, the selection process of Step S22 in the actual operation process is performed repeatedly. In Step S23, the selection control unit 313 determines whether or not the target model data selected this time is different from the target model data selected last time. If the target model data selected this time is different from the target model data selected last time (Y in Step S23), the process flow proceeds to Step S24. If the target model data selected last time does not exist, i.e., if the target model data selected this time is the target model data selected first time (Y in Step S23), the process flow also proceeds to Step S24. On the other hand, if the target model data selected this time is the same as the target model data selected last time (N in Step S23), the process flow returns to Step S21.

In Step S24, the target model data selected this time by the selection control unit 313 is sent to the vehicle onboard apparatus 10. The sent target model data is received by the vehicle onboard apparatus 10. After Step S24, the process flow proceeds to Step S25.

In Step S25, the model setting unit 114 (see FIG. 3) uses the target model data received from the server apparatus 30 so as to set (create) the image recognition model 113. More specifically, by setting parameters in the target model data to the NN 113a, the image recognition model 113 to which parameters in the target model data are applied is set (created). After Step S25, the process flow proceeds to Step S26.

In Step S26, the image recognition unit 112 performs image recognition using the set image recognition model 113. After that, the process flow returns to Step S21, and the processes of Step S21 and after are repeated. The image recognition in Step S26 is repeatedly performed after once reached Step S26, and after the trigger condition is satisfied, the image recognition model 113 is updated every time when the processes of Steps S24 and S25 are performed.

The model data generation process of FIG. 10 is further described. In the model data generation process, machine learning is performed in each of the first to the m-th learning conditions, and among the first to the m-th learning conditions, any two learning conditions are different from each other.

Machine learning in the j-th learning condition is machine learning based on the j-th learning image data set. The j-th learning image data set includes a plurality of learning images and annotation information of each learning image. Each learning image in the j-th learning image data set is a photographed image of a camera mounted in an image acquisition vehicle in the j-th photographing environment. The image acquisition vehicles may include the vehicle CR, or may include other vehicles (not shown). The annotation information for a learning image specifies type and position of an object to be detected in the learning image.

A specific example of a plurality of photographing environments is mentioned below. For embodiment and convenience of description, a first time slot and a second time slot are supposed as two time slots that do not overlap each other. For instance, the first time slot is a time slot from ten a.m. to four p.m. in the day, while the second time slot is a time slot from seven p.m. in the day to four a.m. in the next day.

As to a first photographing environment, in the first time slot, the road in the element area AR[1] is not congested, and weather is fine in the element area AR[1]. Each learning image in the first learning image data set is taken by the camera mounted in the image acquisition vehicle, which travels in the element area AR[1] in the first photographing environment.

Therefore, the model data MD[1] provides appropriate image recognition when the vehicle CR travels in the element area AR[1] in the first time slot, in the environment of non-congestion and fine weather. Therefore, in the actual operation process, if the vehicle CR is located in the element area AR[1], and if the current time is in the first time slot, and if the element area AR[1] is not congested, and if the weather is fine in the element area AR[1], the selection control unit 313 selects the model data MD[1] as the target model data.

As to a second photographing environment, in the second time slot, the road in the element area AR[1] is not congested, and weather is fine in the element area AR[1]. Each learning image in the second learning image data set is taken by the camera mounted in the image acquisition vehicle, which travels in the element area AR[1] in the second photographing environment.

Therefore, the model data MD[2] provides appropriate image recognition when the vehicle CR travels in the element area AR[1] in the second time slot, in the environment of non-congestion and fine weather. Therefore, in the actual operation process, if the vehicle CR is located in the element area AR[1], and if the current time is in the second time slot, and if the element area AR[1] is not congested, and if the weather is fine in the element area AR[1], the selection control unit 313 selects the model data MD[2] as the target model data.

As to a third photographing environment, in the first time slot, the road in the element area AR[1] is congested, and weather is fine in the element area AR[1]. Each learning image in the third learning image data set is taken by the camera mounted in the image acquisition vehicle, which travels in the element area AR[1] in the third photographing environment.

Therefore, the model data MD[3] provides appropriate image recognition when the vehicle CR travels in the element area AR[1] in the first time slot, in the environment of congestion and fine weather. Therefore, in the actual operation process, if the vehicle CR is located in the element area AR[1], and if the current time is in the first time slot, and if the element area AR[1] is congested, and if the weather is fine in the element area AR[1], the selection control unit 313 selects the model data MD[3] as the target model data.

As to a fourth photographing environment, in the first time slot, the road in the element area AR[1] is not congested, and weather is rainy in the element area AR[1]. Each learning image in the fourth learning image data set is taken by the camera mounted in the image acquisition vehicle, which travels in the element area AR[1] in the fourth photographing environment.

Therefore, the model data MD[4] provides appropriate image recognition when the vehicle CR travels in the element area AR[1] in the first time slot, in the environment of non-congestion and rainy weather. Therefore, in the actual operation process, if the vehicle CR is located in the element area AR[1], and if the current time is in the first time slot, and if the element area AR[1] is not congested, and if the weather is rainy in the element area AR[1], the selection control unit 313 selects the model data MD[4] as the target model data.

As for the element area AR[1], similarly to the description above, the model data can be generated for each combination of the time information, the traffic state information, and the weather information. The same is true for each element area other than the element area AR[1].

For instance, suppose a case in which there are three types of time information (first to third time slots), and there are two types of traffic state information (congestion or non-congestion) and three types of weather information (fine, cloudy, or rainy weather) in each element area. In this case, total 18 (=3×2×3) types of model data can be generated for one element area. Further, when 18 types of model data are generated for each element area, total 18×n types of model data are held as the model data MD[1] to MD[m] in the database 32.

However, it may be possible to apply the same model data to a plurality of element areas. For example, suppose a case in the actual operation process, in which the vehicle CR is located in the element area AR[1], the current time is in the first time slot, traffic is not congested and the weather is fine in the element area AR[1], and then the selection control unit 313 selects the model data MD[1] as the target model data. In this supposition, if the vehicle CR is located in the element area AR[9], and if the current time is in the first time slot, and if the element area AR[9] is not congested, and if the weather is fine, the selection control unit 313 may also select the model data MD[1] as the target model data. This method can be used if it is determined that the element areas AR[1] and AR[9] are similar to each other from viewpoint of image recognition. The combination of first time slot, non-congestion, and fine weather is exemplified above as a combination of the additional reference information, but other combinations (e.g., a combination of second time slot, non-congestion, and fine weather) may be similarly considered. The same is true for combinations in other element areas.

Hereinafter, among a plurality of practical examples, some specific operation examples of the system SYS, applied techniques, variation techniques, and the like are described. The matters mentioned above in this embodiment can be applied to the following practical examples unless otherwise described and unless there is no contradiction. If there is a matter conflicting with the above-mentioned matter in each practical example, description in each practical example may have priority over the above-mentioned matter. In addition, unless there is no contradiction, a matter described in any one of the following practical examples may be applied to any other practical example (in other words, among the plurality of practical examples, two or more practical examples can be combined).

First Practical Example

A first practical example is described below. The method in which all the element areas have the same size and shape is described above with reference to FIG. 6. However, any two element areas may have different sizes or shapes.

Figure 12:
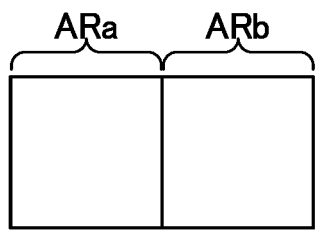
FIG. 12 is a diagram illustrating two neighboring areas according to a first practical example of the embodiment of the present invention.

The area setting unit 311 may set the element areas AR[1] to AR[n] in accordance with characteristics of regions in the service provided area. This is further described below. With reference to FIG. 12, two neighboring areas ARa and ARb are supposed. It is supposed that regional characteristics of the area ARa are different from regional characteristics of the area ARb. In this case, the area setting unit 311 arranges the element area to which the area ARa belongs and the element area to which the area ARb belongs to be different from each other. For instance, the areas ARa and ARb may be set to the element areas AR[1] and AR[2], respectively.

Difference in regional characteristics between the areas ARa and ARb is equivalent to difference in photographing scene between the areas ARa and ARb to an extent that affects performance of image recognition.

The characteristics of regions are determined by type of the region. As types of the region, there are a residential street, a downtown area, a factory district, a mountain range, and the like. Therefore, for example, if the area ARa is a residential street, and if the area ARb is a downtown area, the element area to which the area ARa belongs and the element area to which the area ARb belongs should be different from each other. In this case, the size and shape of the element area to which the area ARa belongs may be set in accordance with the size and shape of the residential street. Similarly, the size and shape of the element area to which the area ARb belongs may be set in accordance with the size and shape of the downtown area.

In the actual operation process, if the vehicle CR is located in the residential area ARa, the model data generated to support the element area to which the area ARa belongs is selected as the target model data and is received by the vehicle onboard apparatus 10. Similarly, in the actual operation process, if the vehicle CR is located in the downtown area ARb, the model data generated to support the element area to which the area ARb belongs is selected as the target model data and is received by the vehicle onboard apparatus 10.

Figure 13:
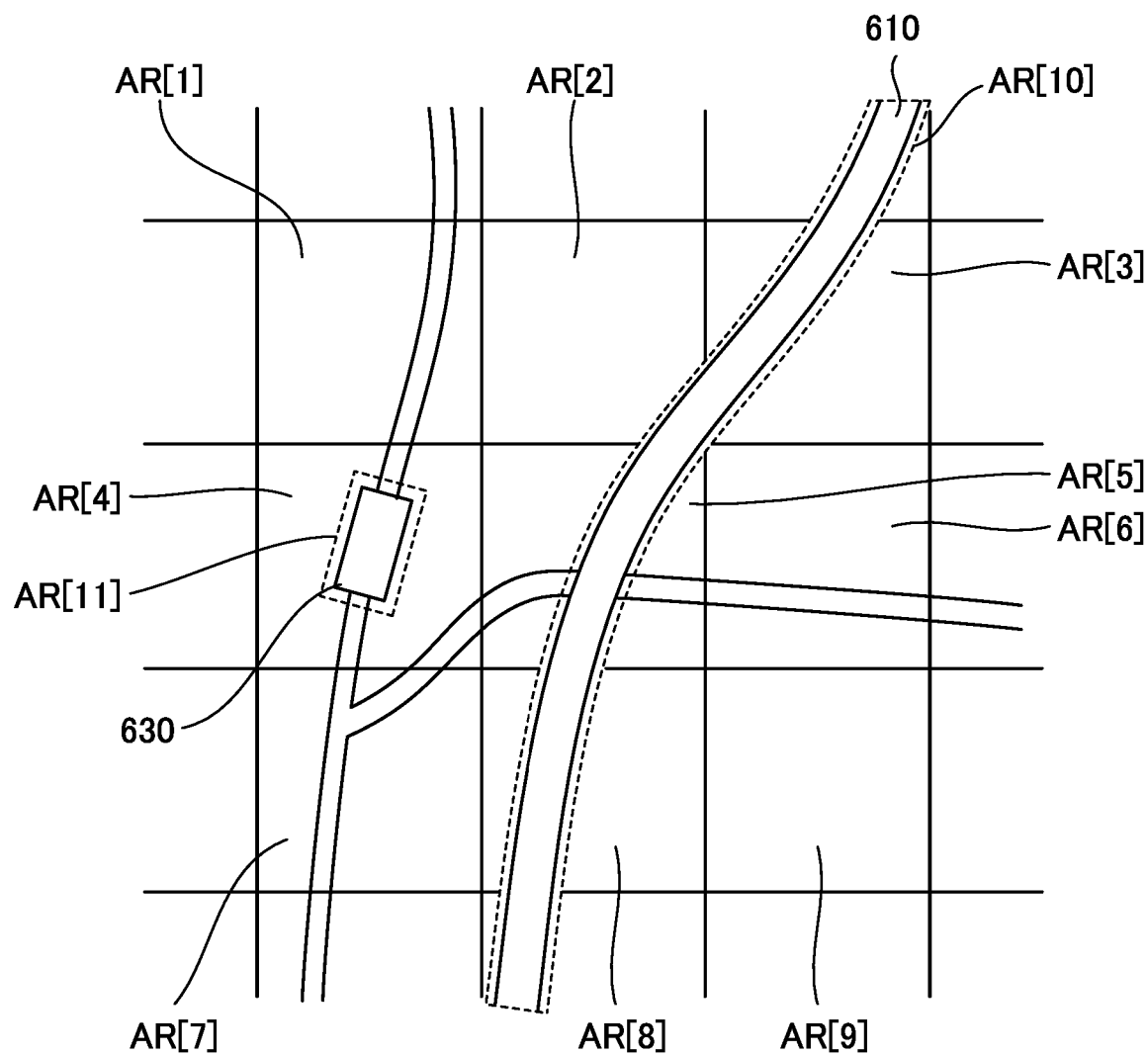
FIG. 13 is a diagram illustrating an example of setting areas corresponding to regional characteristics, according to the first practical example of the embodiment of the present invention.

In addition, for example, with reference to FIG. 13, if an expressway 610 is located in the service provided area, it may be possible to set the element area AR[10] adjusted to the shape of the expressway 610. In the example of FIG. 13, the element area AR[10] is set in such a manner to cross the element areas AR[8], AR[5], AR[2], and AR[3]. Although the element area AR[10] is set so as to include only the expressway 610, but it can include some other roads or landforms.

In the actual operation process, if the vehicle CR is located in the element area AR[10], the model data generated to support the element area AR[10] (model data for the expressway) is selected as the target model data and is received by the vehicle onboard apparatus 10.

Further, for example, with reference to FIG. 13, if a tunnel 630 is located in the service provided area, it may be possible to set the element area AR[11] adjusted to the shape of the tunnel 630. In the example of FIG. 13, the element area AR[11] is set inside the contour of the element area AR[4]. Although the element area AR[11] is set so as to include only the tunnel 630, but it can include some other roads or landforms.

In the actual operation process, if the vehicle CR is located in the element area AR[11], the model data generated to support the element area AR[11] (model data for the tunnel) is selected as the target model data and is received by the vehicle onboard apparatus 10.

As described in this example, by setting the element area in consideration of regional characteristics, the vehicle onboard apparatus 10 can perform appropriate image recognition adjusted to the regional characteristics (preferably optimal image recognition).

Second Practical Example

A second practical example is described below. In the second practical example, on the assumption that the additional reference information includes the vehicle speed information (see FIG. 8), a method of using the vehicle speed information is described below. As described above, the vehicle speed information is obtained as a part of the vehicle information by the in-vehicle sensor unit 22 (see FIG. 3). The vehicle information including the vehicle speed information is sent periodically from the vehicle onboard apparatus 10 to the server apparatus 30, or it is sent from the vehicle onboard apparatus 10 to the server apparatus 30 in response to request from the server apparatus 30.

In Step S22 in the actual operation process (see FIG. 11), the selection control unit 313 according to the second practical example selects the target model data on the basis of the position information of the vehicle CR and the additional reference information including the vehicle speed information.

Figure 14:
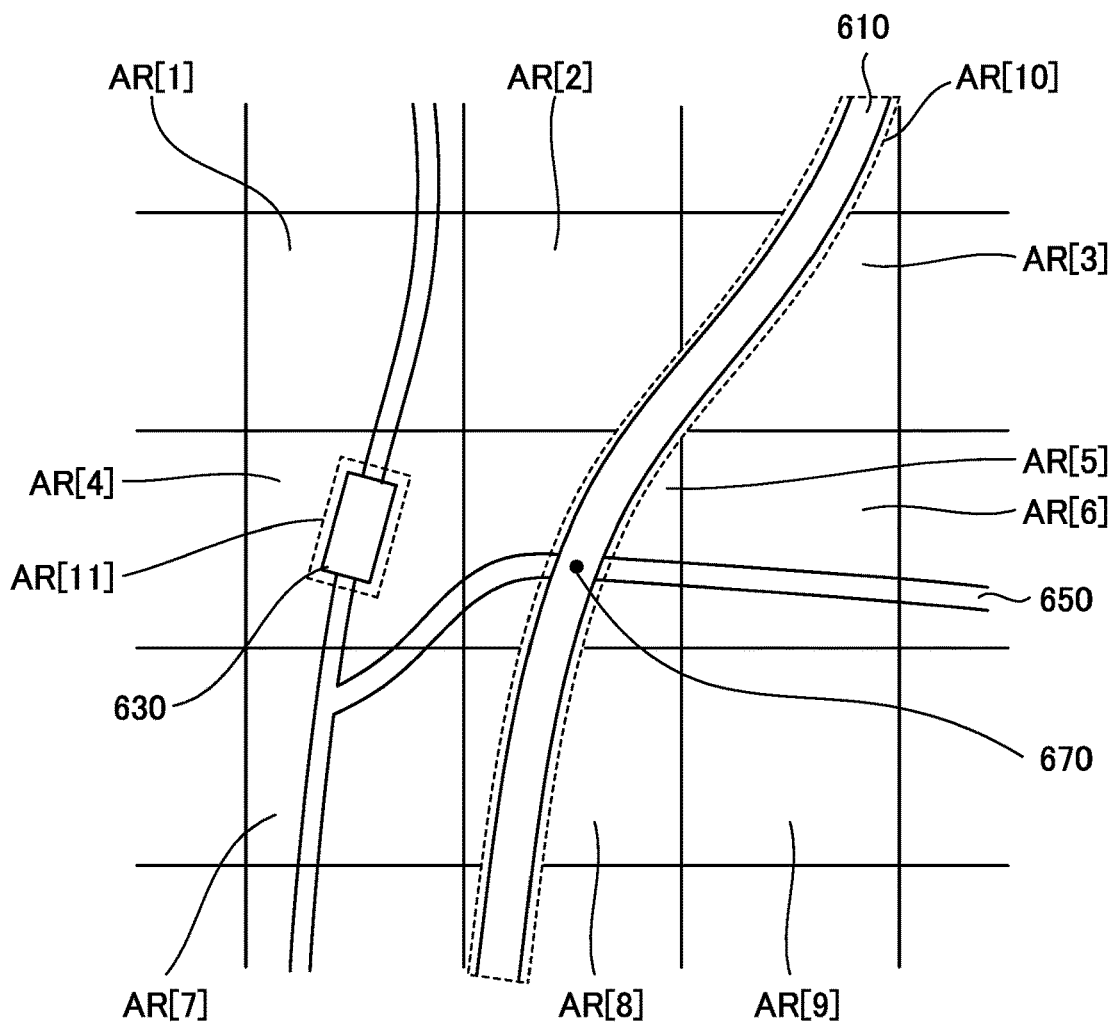
FIG. 14 is a diagram to explain a specific example using vehicle speed information, according to a second practical example of the embodiment of the present invention.

With reference to FIG. 14, a specific example using the vehicle speed information is described below. FIG. 14 is a diagram in which a marker that indicates a point 670 is added to FIG. 13. At the point 670, the expressway 610 and an open road 650 cross each other in grade separation. If the point 670 is on the open road 650, the point 670 belongs to the element area AR[5], while if the point 670 is on the expressway 610, the point 670 belongs to the element area AR[10]. However, if position information of the vehicle CR indicates longitude and latitude of the point 670, it is difficult to determine whether the vehicle CR is traveling on the expressway 610 or on the open road 650.

In consideration of this, in a case CS2_1 where position information of the vehicle CR indicates that current position of the vehicle CR corresponds to the point 670, the selection control unit 313 estimates a type of the road on which the vehicle CR is traveling, on the basis of the vehicle speed information. In this case, if speed of the vehicle CR indicated in the vehicle speed information is a predetermined reference speed or more, it is estimated that the vehicle CR is currently traveling on the expressway 610. If speed of the vehicle CR indicated in the vehicle speed information is less than the reference speed, it is estimated that the vehicle CR is currently traveling on the open road 650. In this case, the reference speed is 80 kilometers per hour, for example.

In the case CS2_1, if it is estimated that the vehicle CR is currently traveling on the expressway 610, the selection control unit 313 determines that the current position of the vehicle CR belongs to the element area AR[10]. As a result, the model data to support the element area AR[10] (therefore, the model data suitable for the expressway 610) is selected as the target model data.

In the case CS2_1, if it is estimated that the vehicle CR is currently traveling on the open road 650, the selection control unit 313 determines that the current position of the vehicle CR belongs to the element area AR[5]. As a result, the model data to support the element area AR[5] (therefore, the model data suitable for the open road 650) is selected as the target model data.

As described in this practical example, by arranging the additional reference information to include the vehicle speed information so as to select the model data, the vehicle onboard apparatus 10 can perform appropriate image recognition adjusted to the type or the like of the road on which the vehicle CR is traveling (preferably optimal image recognition).

Note that, although the expressway 610 and the open road 650 cross each other in grade separation in the example of FIG. 14, the method described in this practical example can be used also in the case where the expressway 610 and the open road 650 are located in parallel horizontally or vertically. The position information of the vehicle CR obtained from the GPS processing unit 23 can include an error. Depending on degree of error, it may be mistaken that the vehicle CR is traveling on the open road 650 though it is actually traveling on the expressway 610 (it may also be mistaken in the opposite way). In particular, if a mobile information terminal apparatus such as a smartphone is used as the vehicle onboard apparatus 10, the vehicle onboard apparatus 10 may move in the cabin so that an error can easily occur in the position information. By using the method described in this practical example, the mistake as described above can be suppressed.

In addition, although in the above described method, the type of the road on which the vehicle CR is traveling is estimated on the basis of the vehicle speed information, it may be possible to estimate the type of the road on which the vehicle CR is traveling, on the basis of a movement history of the vehicle CR. In other words, in the case CS2_1, a movement track of the vehicle CR in the past is specified from history of the position information of the vehicle CR. If the specified movement track of the vehicle CR is a track on the expressway 610, it can be estimated that the vehicle CR is currently traveling on the expressway 610. On the contrary, if the specified movement track of the vehicle CR is a track on the open road 650, it can be estimated that the vehicle CR is currently traveling on the open road 650.

Third Practical Example

Figure 15:
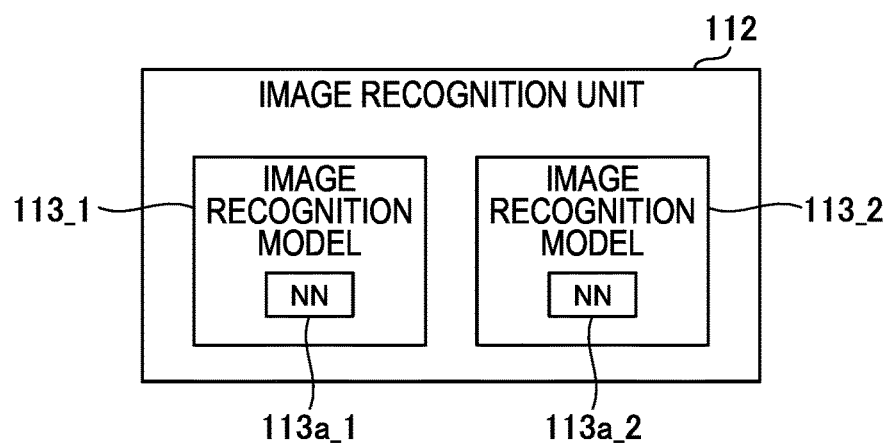
FIG. 15 is a diagram illustrating a state where the image recognition unit has two image recognition models, according to a third practical example of the embodiment of the present invention.

A third practical example is described below. The image recognition unit 112 may be equipped with a plurality of image recognition models 113, each of which has a neural network. In this case, the image recognition unit 112 sets one of the plurality of image recognition models 113 as the target model and uses the target model so as to perform image recognition. Here, as illustrated in FIG. 15, it is supposed that image recognition models 113_1 and 113_2 as the two image recognition models 113 are disposed in the image recognition unit 112. The neural networks provided to the image recognition models 113_1 and 113_2 are referred to as NN 113a_1 and NN 113a_2, respectively.

Each of the NN 113a_1 and the NN 113a_2 is the same as the NN 113a described above, and hence the NN 113a_1 and the NN 113a_2 have the same structure. However, at any time point, parameters set to the NN 113a_1 can be different from parameters set to the NN 113a_2. In this way, characteristics of image recognition by the image recognition model 113_1 can be different from characteristics of image recognition by the image recognition model 113_2.

Figure 16:
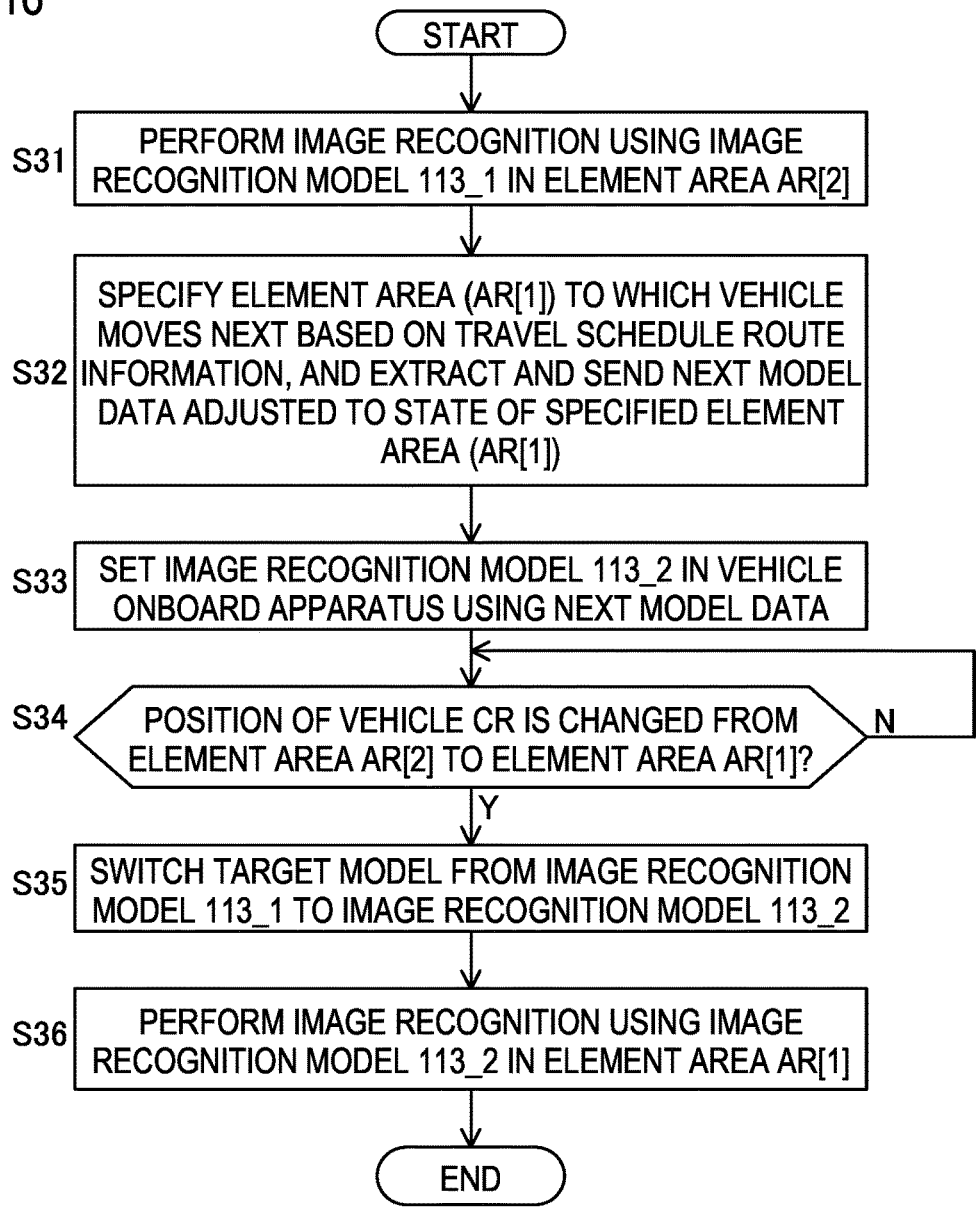
FIG. 16 is a flowchart according to the third practical example of the embodiment of the present invention.

With reference to FIG. 16, an operational example in the third practical example is described below. Operations of FIG. 16 include processes of Steps S31 to S36. Now, consider a reference state in which the vehicle CR is located in the element area AR[2], and the image recognition model 113_1 as the target model is used for performing image recognition (see also FIG. 17). In Step S31, image recognition is performed in the reference state. In other words, in Step S31, the vehicle CR is located in the element area AR[2], and the image recognition model 113_1 as the target model is used for performing image recognition. If the vehicle CR is located in the element area AR[2], parameters in the model data, which supports the element area AR[2] and corresponds to the current time, traffic state information in the element area AR[2], and weather information in the element area AR[2], are set to the NN 113a_1.

In the reference state described above, the selection control unit 313 specifies the element area to which the vehicle CR moves next, on the basis of travel schedule route information of the vehicle CR (Step S32). Further, the selection control unit 313 extracts model data adjusted to the specified element area as next model data from the model data MD[1] to MD[m] (Step S32). The extracted next model data is sent to the vehicle onboard apparatus 10 by the selection control unit 313 (Step S32).

The travel schedule route information is information that indicates a travel schedule route to a goal of the vehicle CR. A navigation apparatus (not shown) mounted in the vehicle CR generates the travel schedule route information, and the travel schedule route information is supplied to the server apparatus 30 via the communication network NET. The navigation apparatus may be disposed separately from the vehicle onboard apparatus 10, or the vehicle onboard apparatus 10 may include the navigation apparatus.

Figure 17:
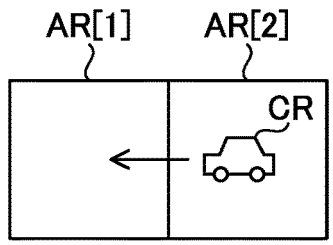
FIG. 17 is a diagram illustrating a vehicle travel route and the like according to the third practical example of the embodiment of the present invention.

Here, as illustrated in FIG. 17, it is supposed that the travel schedule route information indicates that the vehicle CR should move from the element area AR[2] to the element area AR[1]. When the vehicle CR moves from the element area AR[2] to the element area AR[1], it is supposed that the vehicle CR directly reaches the element area AR[1] from the element area AR[2] without passing any element area other than the element area AR[1]. Then, in Step S32, the element area AR[1] is specified as the element area to which the vehicle CR moves next, and the model data adjusted to the element area AR[1] is extracted as the next model data.

In this case, the next model data is extracted on the basis of the additional reference information. In other words, the next model data is extracted on the basis of time information and state information of the element area AR[1]. The state information of the element area AR[1] is information included in the traffic state information and includes information indicating traffic state of the element area AR[1] and information indicating weather in the element area AR[1].

To summarize, during a period while the vehicle CR is traveling in the element area AR[2], the model data, which supports the element area AR[1] and corresponds to the state of the element area AR[1] (the traffic state and weather) based on the additional reference information, is extracted as the next model data.

Specifically, for example, if the current time or expected arrival time of the vehicle CR to the element area AR[1] belongs to the first time slot, and if traffic is not congested and weather is fine in the element area AR[1], the selection control unit 313 extracts the model data MD[1] as the next model data. This is because, as described above, the model data MD[1] provides appropriate image recognition when the vehicle CR travels in the element area AR[1] in the first time slot, in the environment of non-congestion and fine weather.

In addition, for example, if the current time or the expected arrival time of the vehicle CR to the element area AR[1] belongs to the second time slot, and if traffic is not congested and weather is fine in the element area AR[1], the selection control unit 313 extracts the model data MD[2] as the next model data. This is because, as described above, the model data MD[2] provides appropriate image recognition when the vehicle CR travels in the element area AR[1] in the second time slot, in the environment of non-congestion and fine weather.

In addition, for example, if the current time or the expected arrival time of the vehicle CR to the element area AR[1] belongs to the first time slot, and if traffic is congested and weather is fine in the element area AR[1], the selection control unit 313 extracts the model data MD[3] as the next model data. This is because, as described above, the model data MD[3] provides appropriate image recognition when the vehicle CR travels in the element area AR[1] in the first time slot, in the environment of congestion and fine weather.

In addition, for example, if the current time or the expected arrival time of the vehicle CR to the element area AR[1] belongs to the first time slot, and if traffic is not congested and weather is rainy in the element area AR[1], the selection control unit 313 extracts the model data MD[4] as the next model data. This is because, as described above, the model data MD[4] provides appropriate image recognition when the vehicle CR travels in the element area AR[1] in the first time slot, in the environment of congestion and rainy weather.

The next model data extracted and sent in Step S32 is received by the vehicle onboard apparatus 10. In Step S33 after Step S32, the model setting unit 114 uses the received next model data so as to set the image recognition model 113_2. More specifically, parameters in the next model data are set to the NN 113a_2, and hence the image recognition model 113_2 is set (created), to which parameters in the next model data are applied.

After that, it is determined whether or not the position of the vehicle CR is moved from the element area AR[2] to the element area AR[1] (Step S34). This determination may be performed by the in-vehicle control unit 11 or by the server control unit 31. The process of Step S34 is repeated until it is determined that the position of the vehicle CR is changed to the element area AR[1] (N in Step S34). When it is determined that the position of the vehicle CR is changed to the element area AR[1] (Y in Step S34), the process flow proceeds to Step S35.

In Step S35, the model setting unit 114 switches the target model from the image recognition model 113_1 to the image recognition model 113_2. In Step S36 after this switching, the image recognition unit 112 uses the image recognition model 113_2 as the target model so as to perform image recognition. In Step S36, the vehicle CR is located in the element area AR[1].

In this way, during the period while the vehicle CR is traveling in the element area AR[2], the server apparatus 30 extracts the model data expected to be necessary next for the vehicle onboard apparatus 10 as the next model data, and sends the same to the vehicle onboard apparatus 10. During the period while the vehicle CR is traveling in the element area AR[2], the vehicle onboard apparatus 10 uses the image recognition model 113_1 adjusted to the element area AR[2] so as to perform image recognition. On the other hand, during the period while the vehicle CR is traveling in the element area AR[2], the vehicle onboard apparatus 10 sets the image recognition model 113_2 using the received next model data. Then, when the vehicle CR reaches the element area AR[1] so that image recognition using the next model data becomes necessary, the target model is switched from the image recognition model 113_1 to the image recognition model 113_2. After that, during the period while the vehicle CR travels in the element area AR[1], the image recognition model 113_2 may be maintained as the target model.

Also after that, extraction of the next model data and switching of the image recognition models are performed repeatedly along the travel schedule route of the vehicle CR.

Using this method, appropriate image recognition can be performed continuously in the travelling process of the vehicle CR.

Fourth Practical Example

A fourth practical example is described below. In the above description, only one vehicle CR is mentioned, but if there are a plurality of vehicles CR, the above description is applied to each of the vehicles CR.

Figure 18:
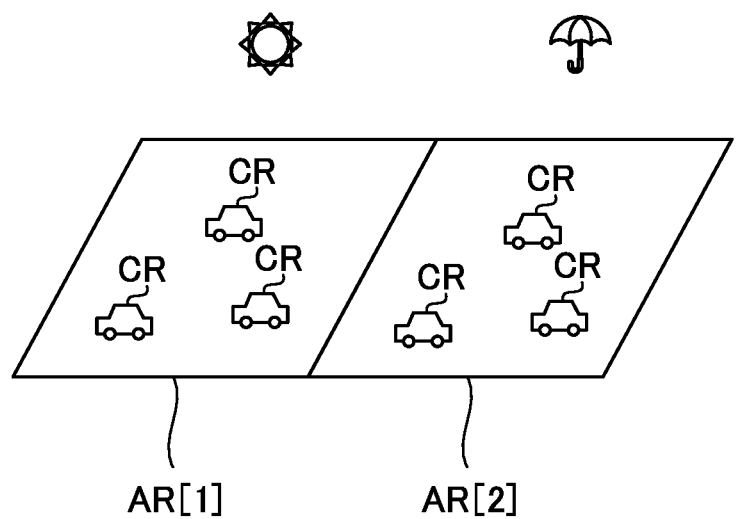
FIG. 18 is a diagram illustrating a state where a plurality of vehicles are located in each element area, according to a fourth practical example of the embodiment of the present invention.

For instance, as illustrated in FIG. 18, suppose a state where a first vehicle group consisting of a plurality of vehicles CR is located in the element area AR[1], and a second vehicle group consisting of a plurality of other vehicles CR is located in the element area AR[2]. Each vehicle CR is equipped with the vehicle onboard apparatus 10, and the vehicle onboard apparatuses 10 of all vehicles CR and the server apparatus 30 constitute the system SYS.

The selection control unit 313 should send the same first target model data to the vehicle onboard apparatuses 10 of the individual vehicles CR in the first vehicle group. The vehicle onboard apparatus 10 of each vehicle CR in the first vehicle group performs image recognition using the first target model data. The first target model data is the model data that supports the element area AR[1], and is the target model data selected corresponding to the current time, the traffic state information of the element area AR[1], and the weather information of the element area AR[1].

The selection control unit 313 should send the same second target model data to the vehicle onboard apparatuses 10 of the vehicles CR in the second vehicle group. The vehicle onboard apparatus 10 of each vehicle CR in the second vehicle group performs image recognition using the second target model data. The second target model data is the model data that supports the element area AR[2], and is the target model data selected corresponding to the current time, the traffic state information of the element area AR[2], and the weather information of the element area AR[2].

In this way, the server apparatus 30 is only required to select the necessary model data in a batch manner for each element area. Therefore, compared with a method of selecting necessary model data for each vehicle CR, the server apparatus 30 has a smaller load.

Note that, although different from the method of this embodiment, the following reference method is also studied. In the reference method, information of the input image is sent from the vehicle onboard apparatus to the server apparatus, and the server apparatus determines whether the switching of models is necessary or not on the basis of information of the input image (pixel values). However, in the reference method, the input image is sent to the server apparatus, and hence communication cost increases. In each method of this embodiment, the input image is not used for determination of switching of models, and hence communication cost can be reduced. In addition, in the reference method, the server apparatus is required to perform determination of switching of models for each vehicle on the basis of the input image for the number of vehicles, and hence huge calculation cost is required. In addition, in the reference method, the switching of models is controlled via scene discrimination based on information of the input image (pixel values), and there is an accuracy problem, such as difficulty in discrimination between travelling in night and travelling in a tunnel.

Fifth Practical Example

A fifth practical example is described below.

It may be possible that the vehicle onboard apparatus 10 performs the whole or a part of the functions of the server apparatus 30. To describe in an extreme manner, it may be possible to dispose the area setting unit 311, the model data obtaining unit 312, and the selection control unit 313 in the in-vehicle control unit 11, and to dispose the database 32 in the vehicle onboard apparatus 10. In particular, for example, a TV relay vehicle or the like is usually equipped with a vehicle onboard apparatus having a server apparatus function. Therefore, if the TV relay vehicle is the vehicle CR, it can be appropriate to allow the vehicle onboard apparatus 10 to perform the whole or a part of the functions of the server apparatus 30.

The embodiment of the present invention can be variously modified within the scope of the technical concept recited in the claims. The embodiment described above is merely an example of the embodiment of the present invention, and meanings of terms used in the present invention and for individual structural elements are not limited to those described in the above embodiment. The specific values indicated in the above description are merely examples, and they can be changed to various values, as a matter of course.

<<Addendum>>

As to the present invention with the specific structural examples described above in the embodiment, the following addendum is added.

The vehicle onboard apparatus (10) according to one aspect of the present invention is a vehicle onboard apparatus mounted in a vehicle, and includes the image recognition unit (112) that performs image recognition on an input image from a camera mounted in the vehicle, and the image recognition unit is configured to perform the image recognition, using the image recognition model (113) corresponding to position information of the vehicle and additional reference information different from the position information.

As the image recognition is performed using the image recognition model corresponding to not only the position information but also the additional reference information, the vehicle onboard apparatus can perform appropriate image recognition adjusted to various situations.

The support apparatus (30) according to one aspect of the present invention is a support apparatus configured to be capable of communicating with the vehicle onboard apparatus (10) that performs image recognition on an input image from a camera mounted in the vehicle, and includes the data holding unit (32, see FIG. 7) that holds a plurality of model data for the vehicle onboard apparatus to set the image recognition model (113) for performing the image recognition, and the selection control unit (313) that selects one of the plurality of model data (MD[1] to MD[m]) on the basis of position information of the vehicle and additional reference information different from the position information, and sends the selected model data to the vehicle onboard apparatus.

As the model data corresponding to not only the position information but also the additional reference information is sent to the vehicle onboard apparatus, the vehicle onboard apparatus can perform the image recognition using the image recognition model corresponding to the position information and additional reference information. As a result, the vehicle onboard apparatus can perform appropriate image recognition adjusted to various situations.

What is claimed is:

1. A vehicle onboard apparatus mounted in a vehicle, the apparatus comprising an in-vehicle processing unit (i) comprising a processor and a memory and (ii) configured to perform image recognition on an input image from a camera mounted in the vehicle, wherein the in-vehicle processing unit:
- sets an image recognition model using a parameter corresponding to position information of the vehicle and additional reference information, which is different from the position information, and performs the image recognition using the image recognition model;
- has a plurality of image recognition models including a first image recognition model and a second image recognition model, and uses a target model that is one of the plurality of image recognition models so as to perform the image recognition; and
- sets the second image recognition model using a parameter corresponding to the additional reference information, in a period while the image recognition is performed using the first image recognition model, and afterwards switches the target model from the first image recognition model to the second image recognition model in accordance with a position change of the vehicle.

2. The vehicle onboard apparatus according to claim 1, wherein
- the vehicle is located in any one of a plurality of areas, and
- the additional reference information includes at least one of time information indicating current time, traffic state information indicating a traffic state in each area, and weather information indicating weather in each area.

3. A vehicle onboard apparatus mounted in a vehicle, the apparatus comprising an in-vehicle processing unit (i) comprising a processor and a memory and (ii) configured to perform image recognition on an input image from a camera mounted in the vehicle, wherein the in-vehicle processing unit:
- performs the image recognition using an image recognition model corresponding to position information of the vehicle and additional reference information different from the position information, the additional reference information including vehicle speed information indicating a traveling speed of the vehicle; and
- performs the image recognition using the image recognition model in accordance with a type of a road on which the vehicle is traveling as estimated based on the vehicle speed information.

4. An image recognition method comprising an image recognition step to perform image recognition on an input image from a camera mounted in a vehicle, wherein the image recognition step includes:
- performing the image recognition using an image recognition model corresponding to position information of the vehicle and additional reference information different from the position information, the additional reference information including vehicle speed information indicating a traveling speed of the vehicle, and
- performing the image recognition using the image recognition model in accordance with a type of a road on which the vehicle is traveling as estimated based on the vehicle speed information.

\* \* \* \* \*